(12) United States Patent
Berglund et al.

(10) Patent No.: US 10,530,649 B2
(45) Date of Patent: Jan. 7, 2020

(54) EVENT SIGNALING IN A WIRELESS BACKHAUL NETWORK

(71) Applicant: Telefonaktiebolaget LM Ericsson (publ), Stockholm (SE)

(72) Inventors: Joel Berglund, Linköping (SE); Pål Frenger, Linköping (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 8 days.

(21) Appl. No.: 15/540,616

(22) PCT Filed: Jan. 15, 2015

(86) PCT No.: PCT/EP2015/050689
§ 371 (c)(1),
(2) Date: Jun. 29, 2017

(87) PCT Pub. No.: WO2016/112985
PCT Pub. Date: Jul. 21, 2016

(65) Prior Publication Data
US 2017/0359219 A1    Dec. 14, 2017

(51) Int. Cl.
*H04L 12/24* (2006.01)
*H04W 24/02* (2009.01)
(Continued)

(52) U.S. Cl.
CPC .......... *H04L 41/0836* (2013.01); *H04W 8/24* (2013.01); *H04W 24/02* (2013.01); *H04W 76/19* (2018.02); *H04L 41/06* (2013.01); *H04W 40/248* (2013.01); *H04W 52/0225* (2013.01); *H04W 68/00* (2013.01)

(58) Field of Classification Search
CPC ....... H04L 41/06–0686; H04L 41/0836; H04L 51/24; H04L 61/20764; H04L 12/895; H04L 29/12301; H04L 43/00; H04L 43/08; H04L 63/1408; H04W 76/028; H04W 24/02; H04W 8/24; H04W 68/20; H04W 40/248; H04W 4/20; H04W 4/00; H04W 52/244; H04W 52/0225; H04W 50/0251; H04W 28/12
See application file for complete search history.

(56) References Cited

U.S. PATENT DOCUMENTS 8,717,983 B2   5/2014  Wei et al.
8,761,021 B2   6/2014  Ray et al.
(Continued)

OTHER PUBLICATIONS

International Search Report and Written Opinion of the International Searching Authority for International Application No. PCT/EP2015/050689 (Sep. 18, 2015) 12 pages.

*Primary Examiner* — Warner Wong
(74) *Attorney, Agent, or Firm* — Sage Patent Group

(57) ABSTRACT

There is provided a method for signaling an event associated with a wireless terminal in a communications network. The method is performed by an information providing node. The method comprises detecting an event associated with a wireless terminal, the event causing a change of operation in at least a client node or a hub node in a wireless backhaul network. The method comprises transmitting a message indicative of the event towards an information receiving node.

30 Claims, 7 Drawing Sheets

(51) Int. Cl.
*H04W 76/19* (2018.01)
*H04W 8/24* (2009.01)
H04W 40/24 (2009.01)
H04W 52/02 (2009.01)
H04W 68/00 (2009.01)

(56) References Cited

U.S. PATENT DOCUMENTS

| | | | |
|---|---|---|---|
| 9,113,352 B2 | 8/2015 | Agarwal et al. | |
| 2002/0034937 A1* | 3/2002 | Lim | H04W 72/048 |
| | | | 455/403 |
| 2004/0092765 A1* | 5/2004 | Wulff | C07F 9/4093 |
| | | | 562/18 |
| 2008/0108326 A1* | 5/2008 | Park | H04W 36/0055 |
| | | | 455/411 |
| 2009/0327443 A1* | 12/2009 | Pawar | H04L 1/1607 |
| | | | 709/207 |
| 2011/0153745 A1* | 6/2011 | Limont | G06F 17/30575 |
| | | | 709/204 |
| 2012/0170508 A1* | 7/2012 | Sawai | H04B 7/155 |
| | | | 370/315 |
| 2014/0135007 A1* | 5/2014 | Yu | H04W 36/00 |
| | | | 455/436 |
| 2014/0194127 A1* | 7/2014 | Wang | H04W 36/0055 |
| | | | 455/438 |
| 2014/0269251 A1 | 9/2014 | Zhou et al. | |
| 2016/0262143 A1* | 9/2016 | Breuer | H04W 76/20 |
| 2017/0272219 A1* | 9/2017 | Park | H04W 72/0486 |

\* cited by examiner

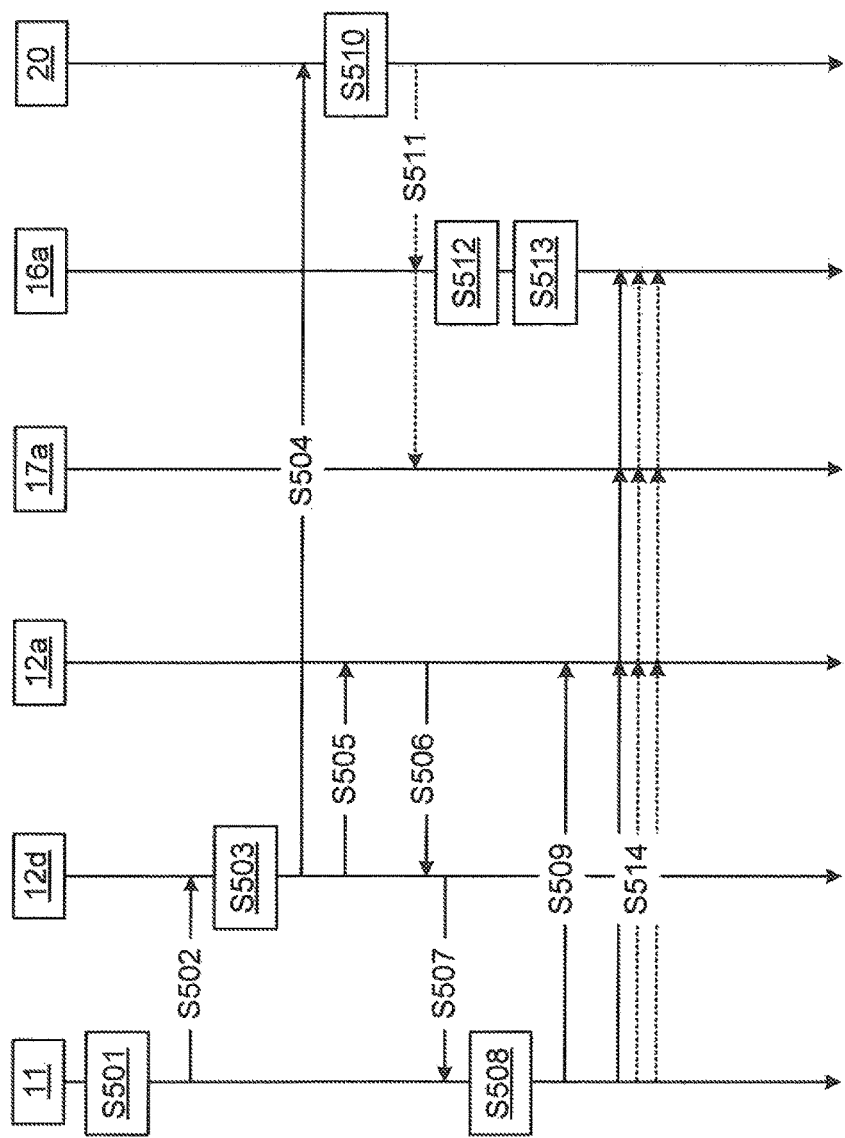

EVENT SIGNALING IN A WIRELESS BACKHAUL NETWORK

CROSS REFERENCE TO RELATED APPLICATIONS

This application is a 35 U.S.C. § 371 national stage application of PCT International Application No. PCT/EP2015/050689, filed on Jan. 15, 2015, the disclosure and content of which is incorporated by reference herein in its entirety.

TECHNICAL FIELD

Embodiments presented herein relate to signaling an event associated with a wireless terminal, and particularly to methods, an information providing node, an information receiving node, a backhaul controller node, computer programs, and a computer program product for signaling, or handling, an event associated with a wireless terminal in a communications network.

BACKGROUND

In communications networks, there may be a challenge to obtain good performance and capacity for a given communications protocol, its parameters and the physical environment in which the communications network is deployed.

For example, increase in traffic within communications networks such as mobile broadband systems and an equally continuous increase in terms of the data rates requested by end-users (wireless terminals) accessing services provided by the communications networks may impact how cellular communications networks are deployed. One way of addressing this increase is to deploy lower-power network nodes, such as micro or pico radio base station (RBS) network nodes (hereinafter denoted PBS), within the coverage area of a macro cell served by a macro base station (MBS) network node. Examples where such additional network nodes may be deployed are scenarios where end-users are highly clustered. Examples where wireless terminals of end-users may be highly clustered include, but are not limited to, around a square, in a building, such as an office or a shopping mall, or along a road in a rural area. Such a deployment of additional network nodes is referred to as a heterogeneous or multi-layered network deployment, where the underlying layer of low-power micro or PBS network nodes does not need to provide full-area coverage. Rather, low-power network nodes may be deployed to increase capacity and achievable data rates where needed. Outside of the micro- or PBS-layer coverage, end-users would access the communications network by means of the overlaid macro cell.

Backhauling based on the Long Term Evolution (LTE) telecommunications standards may be carried either over normal IMT-bands, e.g. the 2.6 GHz frequency band, or by running LTE baseband communications on higher radio frequencies, such as in the 28 GHz frequency band. LTE based backhauling implies that the PBS network nodes are connected to a client node which is used to create a wireless link to a hub node.

In any of the above two cases, the wireless links are typically managed by LTE core control mechanisms. For example, the LTE Mobility Management Entity (MME) may be utilized for session control of the LTE links, and the Home Subscription Service (HSS) may be utilized for storing security and Quality of Service (QoS) characteristics of the wireless links of individual wireless end-user terminals embedded in the PBS network node.

Moreover, in practice more than one client node may connect to a common hub node. This implies support for Radio Resource Management (RRM) functions, such as scheduling and prioritization of the traffic to and from the different clients, at the hub node.

To each client node there might be several PBS network nodes, each of which may offer one or several different radio access technologies, such as based on the Universal Mobile Telecommunications System (UMTS), LTE, or IEEE 802.11X to the wireless end-user terminals of the end-users. Therefore there is a need to differentiate between the corresponding backhaul traffic to different nodes in the communications network. For example, any LTE compliant traffic may need to end up in nodes such as the serving gateway (S-GW) or the MME and any WiFi compliant traffic may end up in an edge router or an Evolved Packet Data Gateway (ePDG).

Moreover, for a given radio access technology (RAT), QoS differentiation is provided to the end-users (i.e., to the wireless end-user terminals of the end-users) so that e.g. guaranteed bitrate (GBR) services, such as voice calls, will not be disturbed by best effort (BE) services, such as web browsing. In order to enable this, QoS differentiation is needed also on the backhaul links.

If the wireless backhaul is based on LTE, there are tools that provide both the routing functions and QoS differentiation, such as the LTE bearer concept. Typically then, for each type of RAT, one GBR and one BE bearer are created on the backhaul links. In general there are different frameworks for prioritize between different traffic that can, for example determine if 10 Mbit/s Voice over IP (VoIP) data is more or less prioritized than 100 Mbit/s web-surfing data.

From an energy point of view, it may be beneficial to perform some kind of reconfiguration of the backhaul links in order to reduce the energy consumption. One example is to shut off one or more power amplifiers (Pas) at the hubs or and/or to shut off some hubs completely and let the clients connect to a fewer number of hubs.

From a capacity point of view, it may be beneficial to reconfigure the hubs in different ways. One example is to activate more hubs and redirect the client antennas to point towards other hubs so as to prevent, or at least mitigate, congestion and/or bottlenecks. Another way is for the hubs to create the transmission beams dynamically depending on the clients being served.

Typically, the different ways of reconfigurations imply temporary performance reduction or a delay in the available performance increase which will affect the end-user (wireless terminal) performance. FIG. 13 schematically illustrates a temporary performance drop which could occur during a backhaul radio access reconfiguration procedure. In a communications network undergoing an end-user access reconfiguration procedure such temporary performance drop may be especially severe if the backhaul system only reacts on the current load from the end-user part of the communications network. Depending on the functionality in the backhaul system and how fast it is enabled to react, different situations may occur. For example, in a worst case the wireless backhaul network notices a lowered end-user load during the end-user reconfiguration procedure and may thus determine to reconfigure to a lower capacity setting. For example, if the end-user reconfiguration is only a delay, the wireless backhaul network may perform the reconfigure procedure after the end-user reconfiguration is finished, thus having the impact that two reconfiguration delays occur before the switch to a higher capacity state is finished.

Hence, there is a need for an improved handling of reconfiguration in wireless backhaul networks.

SUMMARY

An object of embodiments herein is to provide efficient handling of reconfiguration in wireless backhaul networks.

According to a first aspect there is presented a method for signaling an event associated with a wireless terminal in a communications network. The method is performed by an information providing node. The method comprises detecting an event associated with a wireless terminal, the event causing a change of operation in at least a client node or a hub node in a wireless backhaul network. The method comprises transmitting a message indicative of the event towards an information receiving node.

Advantageously this provides efficient handling of reconfiguration in wireless backhaul networks.

Advantageously this enables nodes in the wireless backhaul network to make accurate reconfiguration decisions which can reduce temporary performance reductions associated with the wireless backhaul network. In turn, this may result in an increased end-user experience. Potentially these reconfigurations can be performed during the reconfiguration steps performed by the end-user part of the communications network, meaning that the wireless backhaul network can be reconfigured when the end-user part of the communications network is in a low performance state, meaning that any performance drop in the wireless backhaul network does not affect the end-users.

According to a second aspect there is presented an information providing node for signaling an event associated with a wireless terminal in a communications network. The information providing node comprises a processing unit. The processing unit is configured to cause the information providing node to detect an event associated with a wireless terminal, the event causing a change of operation in at least a client node or a hub node in a wireless backhaul network. The processing unit is configured to cause the information providing node to transmit a message indicative of the event towards an information receiving node.

According to a third aspect there is presented a computer program for signaling an event associated with a wireless terminal in a communications network, the computer program comprising computer program code which, when run on a processing unit of a information providing node, causes the information providing node to perform a method according to the first aspect.

According to a fourth aspect there is presented a method for handling an event associated with a wireless terminal in a communications network. The method is performed by an information receiving node in the wireless backhaul network. The method comprises receiving a configuration alert message indicative of an event associated with a wireless terminal, the configuration alert message having been generated by an information providing node. The method comprises determining a re-configuration action causing a change of operation in at least a client node or a hub node in the wireless backhaul network based on the received configuration alert message.

According to a fifth aspect there is presented an information receiving node for handling an event associated with a wireless terminal in a communications network. The information receiving node comprises a processing unit. The processing unit is configured to cause the information receiving node to receive a configuration alert message indicative of an event associated with a wireless terminal, the configuration alert message having been generated by an information providing node. The processing unit is configured to cause the information receiving node to determine a re-configuration action causing a change of operation in at least a client node or a hub node in the wireless backhaul network based on the received configuration alert message.

According to a sixth aspect there is presented a computer program for handling an event associated with a wireless terminal in a communications network, the computer program comprising computer program code which, when run on a processing unit of a information receiving node, causes the information receiving node to perform a method according to the fourth aspect.

According to a seventh aspect there is presented a method for signaling an event associated with a wireless terminal in a communications network, the method being performed by a backhaul controller node. The method comprises receiving a message indicative of an event associated with a wireless terminal, the event causing a change of operation in at least a client node or a hub node in a wireless backhaul network, the message being received from an information providing node. The method comprises generating a configuration alert message based on the received message. The method comprises transmitting the configuration alert message to an information receiving node in the wireless backhaul network.

According to an eight aspect there is presented a backhaul controller node for signaling an event associated with a wireless terminal in a communications network. The backhaul controller node comprises a processing unit. The processing unit is configured to cause the backhaul controller node to receive a message indicative of an event associated with a wireless terminal, the event causing a change of operation in at least a client node or a hub node in a wireless backhaul network, the message being received from an information providing node. The processing unit is configured to cause the backhaul controller node to generate a configuration alert message based on the received message. The processing unit is configured to cause the backhaul controller node transmit the configuration alert message to an information receiving node in the wireless backhaul network.

According to a ninth aspect there is presented a computer program for signaling an event associated with a wireless terminal in a communications network, the computer program comprising computer program code which, when run on a processing unit of a backhaul controller node, causes the backhaul controller node to perform a method according to the seventh aspect.

According to a tenth aspect there is presented a computer program product comprising a computer program according to at least one of the third aspect, the sixth aspect, and the ninth aspect, and a computer readable means on which the computer program is stored.

It is to be noted that any feature of the first, second, third, fourth, fifth, sixth, seventh, eight, ninth and tenth aspects may be applied to any other aspect, wherever appropriate. Likewise, any advantage of the first aspect may equally apply to the second, third, fourth, fifth, sixth, seventh, eight, ninth, and/or tenth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 14 and 15 are signalling diagrams according to embodiments.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
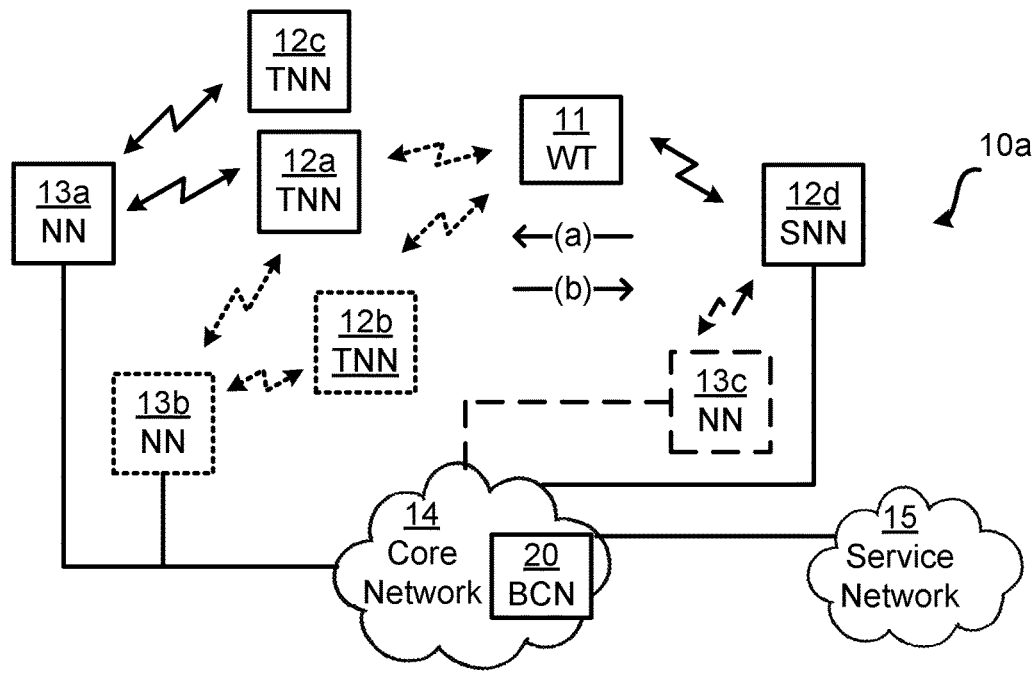
FIGS. 1a and 1b are schematic diagram illustrating communication networks according to embodiments.

FIG. 1a is a schematic diagram illustrating a communications network 10a where embodiments presented herein can be applied. The communications network 10a comprises a macro radio base station (MBS) in the form of a network node 13a providing wireless backhaul to a first pico radio base station (PBS) in the form of a target network node (TNN) 12a and a second PBS in the form of a target network node (TNN) 12c. The communications network 10a may further comprise a further MBS in the form of a network node 13b which may provide wireless backhaul to at least one of the TNN 12a, 12c and a further PBS in the form of a TNN 12b. For illustrative purposes it is assumed that at least the hub node (see, FIG. 1b below) of NN 13b and at least the client node (see, FIG. 1b below) of TNN 12b initially are powered down. The communications network 10a may comprise a further MBS in the form of a network node 13c which may offer backhaul of the SNN 12d.

The network nodes 12a-d, 13a-c are operatively connected, directly or indirectly, to a core network 14 which in turn is operatively connected to a service providing network 15. The core network 14 comprises logical entities and devices whose functions as such are known to the skilled person. The service providing network 15 may be Internet Protocol based. A wireless end-user terminal (WT) 11 served by a network node 12a, 12b, 12c, 12d is thereby able to access services and data provided by the service providing network 15. The wireless end-user terminal 11 is for illustrative purposes assumed to be in an operating state and initially having a wireless connection to serving network node 12d. The network nodes 12a, 12b, 12c, 12d and their wireless links towards the wireless end-user terminal 11 define an end-user access network 10c (see, FIG. 1b).

The network nodes 12a, 12b, 12c, 12d may provide one or a combination of several radio access technologies over its radio access links, e.g. 3GPP LTE, 3GPP HSPA (high speed packet access), 3GPP GSM (global system for mobile communications) or IEEE 802.11x (WiFi). Additionally, the network nodes 12a, 12b, 12c, 12d may be configured to have one or more wired interfaces towards the wireless end-user terminals 11. At least network nodes 12a, 12b, 12c (and possibly also network node 12d) needs to backhaul the end-user access network traffic and uses a wireless link towards a macro radio base station in the form of the network node 13a, 13b, 13c for this purpose.

The communications network 10a further comprises a backhaul controller node (BCN) 20. The BCN 20 is operatively connected to at least some of the network nodes 12a, 12b, 12c, 12d, 13a, 13b, 13c. The functionality of the BCN 20 will be further disclosed below with reference to the herein disclosed embodiments.

At least network nodes 12a, 12b, 12c (and possibly also network node 12d) may be backhauled by means of "client nodes" (CN) and "hub nodes" (HN). In general terms, the client node and the hub node are logical entities. The client node establishes a backhaul connection to the core network 14 via the hub node. In case of a wireless backhaul, the term "client node" thus denotes the unit (or subunit within a micro or pico radio base station) that connects the micro or pico radio base station 12a, 12b, 12c, 12d to the hub node. The hub node denotes the other end (with respect to the client node) of the wireless backhaul link where the wireless backhaul continues over a wired or wireless connection to the core network.

Figure 1B:
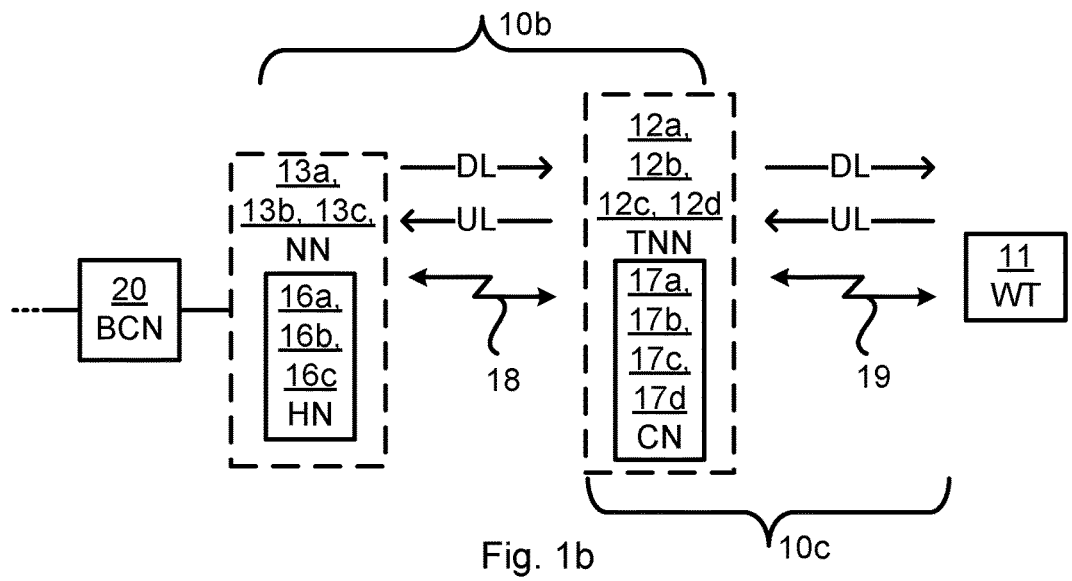

FIG. 1b is a schematic diagram illustrating a communications network where embodiments presented herein can be applied. The communications network of FIG. 1b comprises a macro radio base station (MBS) in the form of a network node 13a, 13b and a pico radio base station (PBS) in the form of a target network node 12a, 12b, 12c. FIG. 1b further schematically illustrates a wireless backhaul network 10b and an end-user access network 10c. In the end-user access network me a wireless end-user terminal (WT) 11 is targeted to be served by a target network node 12a, 12b, 12c over a wireless link 19. In the wireless backhaul network 10b the network nodes 13a, 13b provide wireless backhaul over a wireless link 18 to the target network nodes 12a, 12b, 12c. As illustrated in FIG. 1b, a hub node 16a, 16b, 16c may be co-located with a respective network node 13a, 13b, and a client node 17a, 17b, 17c, 17d may be co-located with a respective target network node 12a, 12b, 12c, 12d. Hence, each hub node 16a, 16b, 16c may be implemented in a macro radio base station, and each client node 17a, 17b, 17c, 17d may be implemented in a micro radio base station or a pico radio base station. However, a pico radio base station and a client node 17a, 17b, 17c, 17d do not have to be co-located. The same applies for the hub nodes 16a, 16b, 16c and the macro radio base stations.

Since the micro radio base stations or pico radio base stations have smaller coverage regions than macro base stations, handovers of wireless terminals 11 between micro radio base stations or pico radio base stations or between a micro radio base station or pico radio base station and a macro radio base station may be frequent. Dual connectivity, where the wireless terminal 11 is connected simultaneously to a macro radio base station and a micro radio base station or a pico radio base station is one way to reduce the risk of dropping the connection when the wireless terminal 11 is moved out of the coverage region of the micro radio base station or pico radio base station. However, handovers will still occur. As noted above, such handovers may result in, or, even require, reconfiguration of the backhaul network 10b.

Figure 14:
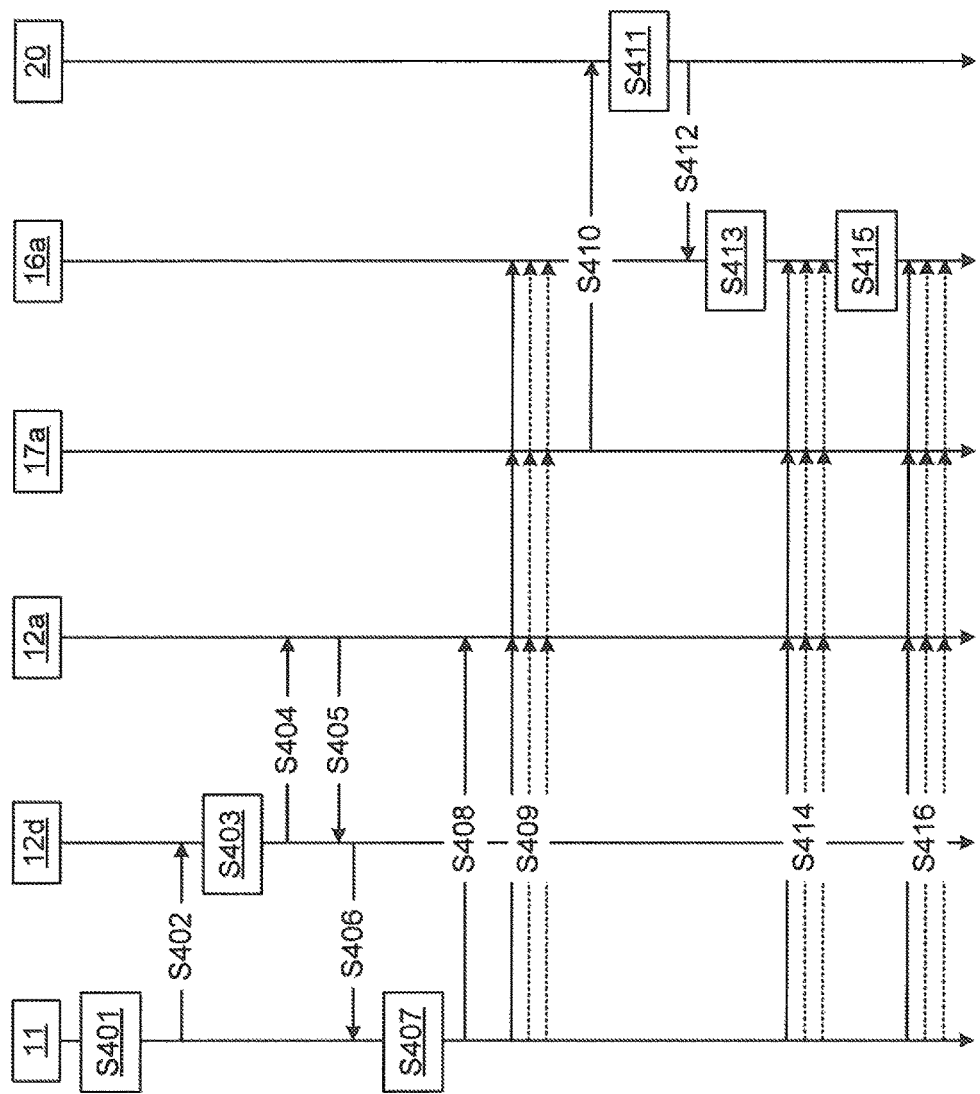

FIG. 14 is a signalling diagram illustrating how such a reconfiguration procedure may be performed when a wireless terminal 11 is handed over from a serving network node 12d to a target network node 12a.

S401: The wireless terminal 11 is operatively connected to, and thus served by, its serving network node 12d.

S402: The wireless terminal 11 performs channel measurements and reports the channel measurements to the serving network node 12d. The channel measurements are by the wireless terminal 11 performed so as to investigate if another network node, i.e., a candidate target network node, would provide better service to the wireless terminal 11 than the serving network node 12d.

S403: It is assumed that such a candidate target network node 12a is identified in step S402. The candidate target network node 12a is assumed to currently provide a medium capacity throughput. The serving network node 12d therefore makes a handover decision.

S404: The serving network node 12d sends a handover request of the wireless terminal 11 to the candidate target network node 12a.

S405: The candidate target network node 12a accepts the handover of the wireless terminal 11 and therefore sends a handover request acknowledgement to the serving network node 12d.

S406: Upon reception of the handover request acknowledgement, the serving network node 12d sends a radio resource control reconfiguration instructions to the wireless terminal 11, thereby instructing the wireless terminal 11 to establish a connection with the target network node 12a.

S407: The wireless terminal 11, upon reception of the radio resource control reconfiguration instructions the wireless terminal 11 detaches from the serving network node 12d.

S408: After having detached from the serving network node 12d the wireless terminal 11 establishes an operational connection to the target network node 12a and synchronizes with the target network node 12a.

S409: The wireless terminal 11 transmits data to the target network node 12a now serving the wireless terminal at a medium throughput level. The data is backhauled to a client node 17a and then to a hub node 16a.

S410: Once the client node 17a receives the data to be backhauled it determines that a high throughput level is needed in order to provide efficient backhaul of the data and therefore sends a request for a high throughput level to the backhaul controller node 20.

S411: The backhaul controller node 20, based on the received request for a high throughput level, determines a reconfiguration.

S412: The backhaul controller node 20 sends instructions of the determined reconfiguration (i.e., a change of operation to a high throughput level) to the hub node 16a.

S413: The hub node 16a starts its reconfiguration in order to provide a high throughput level.

Figure 13:
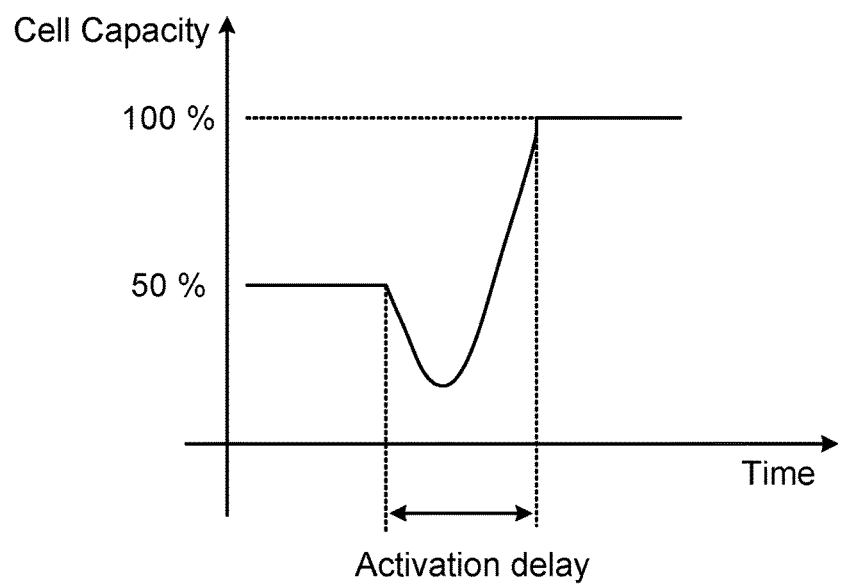
FIG. 13 schematically illustrates cell capacity as a function of time according to state of the art.

S414: The reconfiguration causes a temporary performance drop (as illustrated in FIG. 13 and discussed in more detail in the background section above) which in turn results in the data of the wireless terminal 11 only to be backhauled at a low throughput level.

S415: The hub node 16a finalizes its reconfiguration to provide the high throughput level.

S416: The data of the wireless terminal 11 can now be backhauled at the high throughput level.

As traffic changes in a communications network containing radio nodes with wireless backhaul links it may thus beneficial to adapt the network topology, i.e. by activating, de-activation, or re-configuration of the wireless backhaul links. As disclosed above in step S414, this however typically causes temporary performance degradation (as seen in FIG. 13).

At least some of the embodiments disclosed herein are based on informing neighboring target network nodes and/or network nodes providing backhaul to the target network nodes such that they may perform any required coordinated reconfiguration procedure, and thus predict the backhaul reconfigurations that need to be performed in response to traffic variations.

At least some of the embodiments disclosed herein therefore involve (serving) network nodes to forward data to the network nodes of the (wireless) backhaul network to which the wireless terminal 11 is to be handed over to. The forwarded data may comprise information which by the network nodes of the (wireless) backhaul network may be utilized to make a prediction of the future backhaul capacity need. This enables synchronized reconfigurations of backhaul and end-user access without any degradation in user experience.

The embodiments disclosed herein thus relate to signaling, or handling, an event associated with a wireless terminal in a communications network. In order to obtain such signalling there is provided an information providing node, a method performed by the information providing node, a computer program comprising code, for example in the form of a computer program product, that when run on a processing unit of the information providing node, causes the information providing node to perform the method. In order to obtain such handling there is further provided an information receiving node, a method performed by the information receiving node, and a computer program comprising code, for example in the form of a computer program product, that when run on a processing unit of the information receiving node, causes the information receiving node to perform the method. In order to obtain such signalling there is further provided a backhaul controller node, a method performed by the backhaul controller node, and a computer program comprising code, for example in the form of a computer program product, that when run on a processing unit of the backhaul controller node, causes the backhaul controller node to perform the method.

In general terms, any of the network nodes 12a-d, 13a-c, 20 may act as an information providing node and/or an information receiving node. Without losing generality and for simplification of this disclosure, it will, for illustrative and non-limiting purposes be assumed that the network node 12d acts as an information providing node, and that the network node 12a acts as an information receiving node. According to some embodiments the functionality of the backhaul controller node is implemented in one of the information providing node and the information receiving node and hence at least some of the herein disclosed embodiments are not dependent on the existence of a separate backhaul controller node 20 but only on an information providing node and an information receiving node.

Figure 2A:
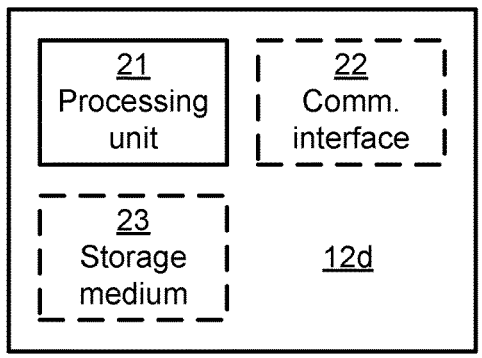
FIG. 2a is a schematic diagram showing functional units of an information providing node according to an embodiment.

FIG. 2a schematically illustrates, in terms of a number of functional units, the components of an information providing node 12d according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 51a (as in FIG. 5), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The information providing node 12d may further comprise a communications interface 22 for communications with at least one wireless terminal 11 and at least one network node 12a-d, 13a-c, 20. As such the communications interface 22 may comprise one or more transmitters and receivers, comprising analogue and digital components and a suitable number of antennas for wireless communications and ports for wireline communications. The processing unit 21 controls the general operation of the information providing node 12d e.g. by sending data and control signals to the communications interface 22 and the storage medium 23, by receiving data and reports from the communications interface 22, and by retrieving data and instructions from the storage medium 23. Other components, as well as the related functionality, of the information providing node 12d are omitted in order not to obscure the concepts presented herein. According to one embodiment the information providing node 12d is co-located with a client node, a hub node, and/or network node 12d. According to another embodiment the information providing node 12d is co-located with the backhaul controller node 20. According to yet another embodiment the information providing node 12d is neither co-located with a client node, a hub node, a network node, or the backhaul controller node 20. Additionally or alternatively, the information providing node may be a source network node (such as a serving network node) of the wireless terminal, or a target network node of the wireless terminal.

Figure 2B:
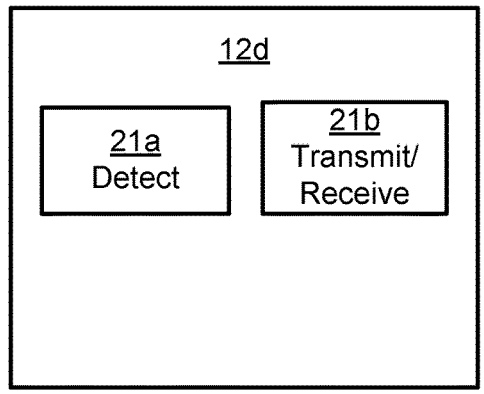
FIG. 2b is a schematic diagram showing functional modules of an information providing node according to an embodiment.

FIG. 2b schematically illustrates, in terms of a number of functional modules, the components of an information providing node 12d according to an embodiment. The information providing node 12d of FIG. 2b comprises a number of functional modules; a detect module 21a configured to perform below step S102, and a transmit and/or receive module 21b configured to perform below steps S104, S106.

The functionality of each functional module 21a-b will be further disclosed below in the context of which the functional modules 21a-b may be used. In general terms, each functional module 21a-b may be implemented in hardware or in software. Preferably, one or more or all functional modules 21a-b may be implemented by the processing unit 21, possibly in cooperation with functional units 22 and/or 23. The processing unit 21 may thus be arranged to from the storage medium 23 fetch instructions as provided by a functional module 21a-b and to execute these instructions, thereby performing any steps as will be disclosed hereinafter.

Figure 3A:
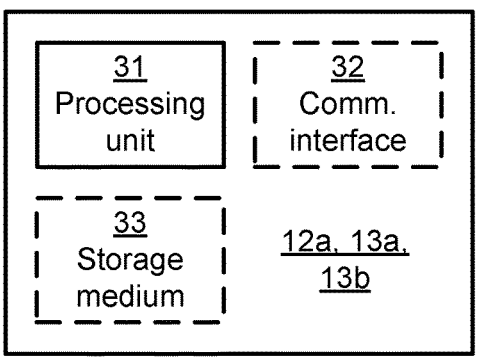
FIG. 3a is a schematic diagram showing functional units of an information receiving node according to an embodiment.

FIG. 3a schematically illustrates, in terms of a number of functional units, the components of an information receiving node 12a according to an embodiment. A processing unit 31 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 51b (as in FIG. 5), e.g. in the form of a storage medium 33. Thus the processing unit 31 is thereby arranged to execute methods as herein disclosed. The storage medium 33 may also comprise persistent storage, which, for example, can be any single one or combination of magnetic memory, optical memory, solid state memory or even remotely mounted memory. The information receiving node 12a may further comprise a communications interface 32 for communications with at least one wireless terminal 11 and at least one network node 12b-c, 13a-c, 20. As such the communications interface 32 may comprise one or more transmitters and receivers, comprising analogue and digital components and a suitable number of antennas for wireless communications and ports for wireline communications. The processing unit 31 controls the general operation of the information receiving node 12a e.g. by sending data and control signals to the communications interface 32 and the storage medium 33, by receiving data and reports from the communications interface 32, and by retrieving data and instructions from the storage medium 33. Other components, as well as the related functionality, of the information receiving node 12a are omitted in order not to obscure the concepts presented herein. According to embodiments the information receiving node 12d is co-located with one of a backhaul controller node 20, a client node 17a, 17b, 17c, 17d, and a hub node 16a, 16b, 16c.

Figure 3B:
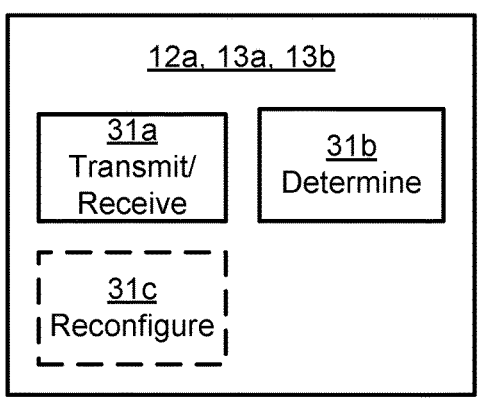
FIG. 3b is a schematic diagram showing functional modules of an information receiving node according to an embodiment.

FIG. 3b schematically illustrates, in terms of a number of functional modules, the components of an information receiving node 12a according to an embodiment. The information receiving node 12a of FIG. 3b comprises a number of functional modules; a transmit and/or receive module 31a configured to perform below steps S202, S210, 5212, and a determine module configured to perform below step S204. The information receiving node 12a of FIG. 3b may further comprise a number of optional functional modules, such as a reconfigure module 31c configured to perform below steps S206, S208. The functionality of each functional module 31a-c will be further disclosed below in the context of which the functional modules 31a-c may be used. In general terms, each functional module 31a-c may be implemented in hardware or in software. Preferably, one or more or all functional modules 31a-c may be implemented by the processing unit 31, possibly in cooperation with functional units 32 and/or 33. The processing unit 31 may thus be arranged to from the storage medium 33 fetch instructions as provided by a functional module 31a-c and to execute these instructions, thereby performing any steps as will be disclosed hereinafter.

Figure 4A:
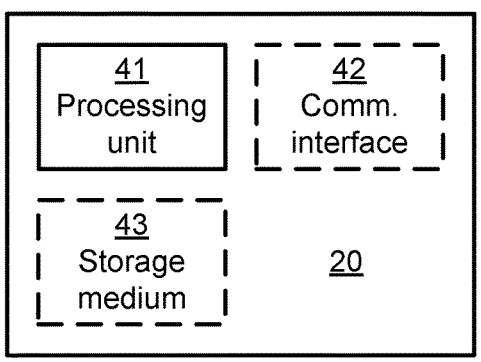
FIG. 4a is a schematic diagram showing functional units of a backhaul controller node according to an embodiment.

FIG. 4a schematically illustrates, in terms of a number of functional units, the components of a backhaul controller node 20 according to an embodiment. A processing unit 41 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 51c (as in FIG. 5), e.g. in the form of a storage medium 43. Thus the processing unit 41 is thereby arranged to execute methods as herein disclosed. The storage medium 43 may also comprise persistent storage, which, for example, can be any single one or combination of magnetic memory, optical memory, solid state memory or even remotely mounted memory. The backhaul controller node 20 may further comprise a communications interface 42 for communications with at least one network node 12a-d, 13a-c. As such the communications interface 42 may comprise one or more transmitters and receivers, comprising analogue and digital components and a suitable number of antennas for wireless communications and ports for wireline communications. The processing unit 41 controls the general operation of the backhaul controller node 20 e.g. by sending data and control signals to the communications interface 42 and the storage medium 43, by receiving data and reports from the communications interface 42, and by retrieving data and instructions from the storage medium 43. Other components, as well as the related functionality, of the backhaul controller node 20 are omitted in order not to obscure the concepts presented herein.

Figure 4B:
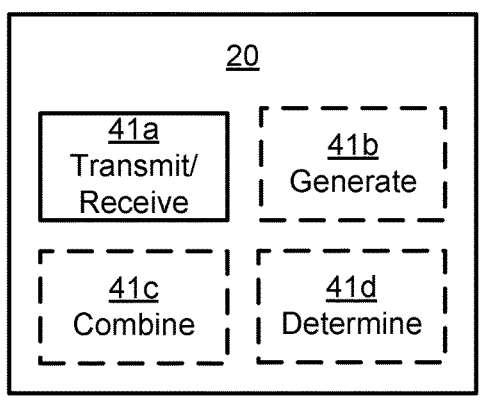
FIG. 4b is a schematic diagram showing functional modules of a backhaul controller node according to an embodiment.

FIG. 4b schematically illustrates, in terms of a number of functional modules, the components of a backhaul controller node 20 according to an embodiment. The backhaul controller node 20 of FIG. 4b comprises a number of functional modules; a transmit and/or receive module 41a configured to perform below steps S302, S302a, S306. The backhaul controller node 20 of FIG. 4b may further comprise a number of optional functional modules, such as any of a generate module 41b configured to perform below step S304, a combine module 41c configured to perform below step S304a, and a determine module 41d configured to perform below step S304b. The functionality of each functional module 41a-d will be further disclosed below in the context of which the functional modules 41a-d may be used. In general terms, each functional module 41a-d may be implemented in hardware or in software. Preferably, one or more or all functional modules 41a-d may be implemented by the processing unit 31, possibly in cooperation with functional units 42 and/or 43. The processing unit 41 may thus be arranged to from the storage medium 43 fetch instructions as provided by a functional module 41a-d and to execute these instructions, thereby performing any steps as will be disclosed hereinafter.

Figure 5:
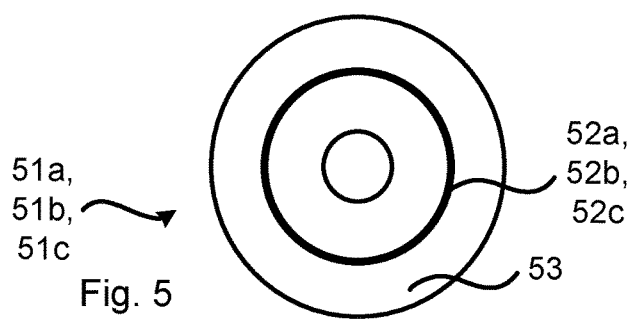
FIG. 5 shows one example of a computer program product comprising computer readable means according to an embodiment.

FIG. 5 shows one example of a computer program product 51a, 51b, 51c comprising computer readable means 53. On this computer readable means 53, a computer program 52a can be stored, which computer program 52a can cause the processing unit 21 and thereto operatively coupled entities and devices, such as the communications interface 22 and the storage medium 23, to execute methods according to embodiments described herein. The computer program 52a and/or computer program product 51a may thus provide means for performing any steps of the backhaul controller node 20 as herein disclosed. On this computer readable means 53, a computer program 52b can be stored, which computer program 52b can cause the processing unit 51 and thereto operatively coupled entities and devices, such as the communications interface 32 and the storage medium 33, to execute methods according to embodiments described herein. The computer program 52b and/or computer program product 51b may thus provide means for performing any steps of the backhaul controller node 20 as herein disclosed. On this computer readable means 53, a computer program 52c can be stored, which computer program 52c can cause the processing unit 41 and thereto operatively coupled entities and devices, such as the communications interface 42 and the storage medium 43, to execute methods according to embodiments described herein. The computer program 52c and/or computer program product 51c may thus provide means for performing any steps of the backhaul controller node 20 as herein disclosed.

In the example of FIG. 5, the computer program product 51a, 51b, 51c is illustrated as an optical disc, such as a CD (compact disc) or a DVD (digital versatile disc) or a Blu-Ray disc. The computer program product 51a, 51b, 51c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 52a, 52b, 52c is here schematically shown as a track on the depicted optical disk, the computer program 52a, 52b, 52c can be stored in any way which is suitable for the computer program product 51a, 51b, 51c.

Figure 6:
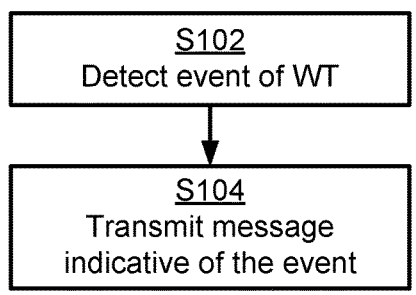
FIGS. 6 to 11 are flowcharts of methods according to embodiments.
Figure 8:
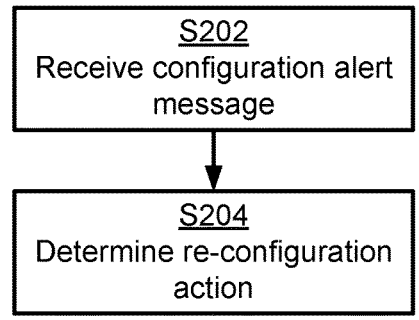
Figure 7:
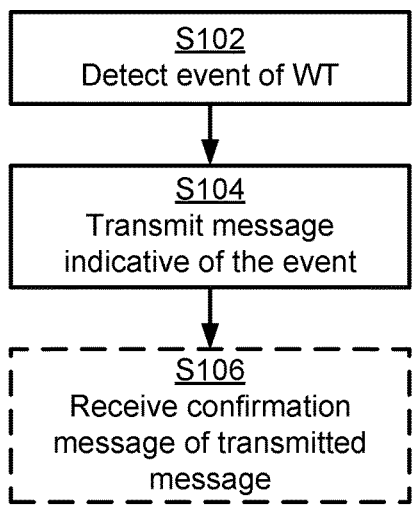
Figure 9:
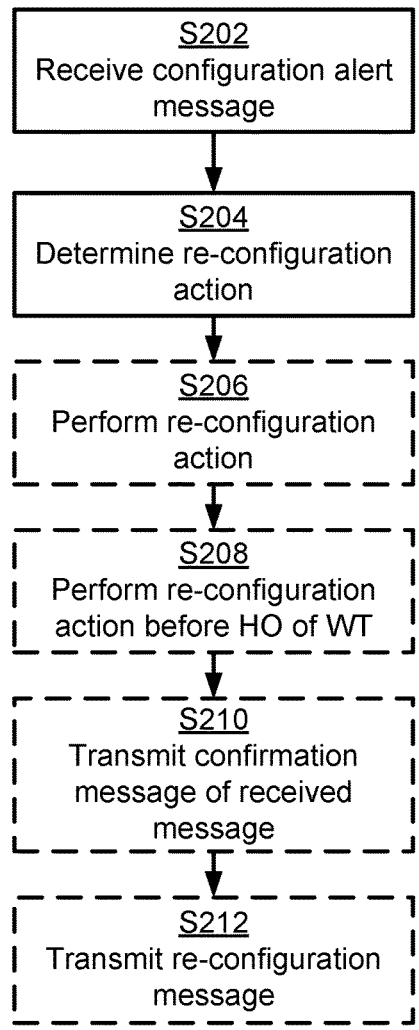
Figure 10:
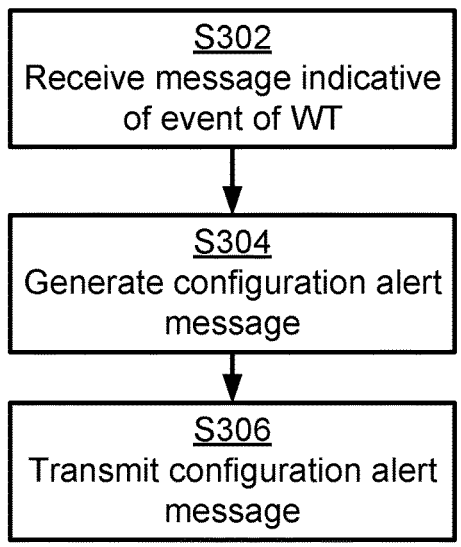
Figure 11:
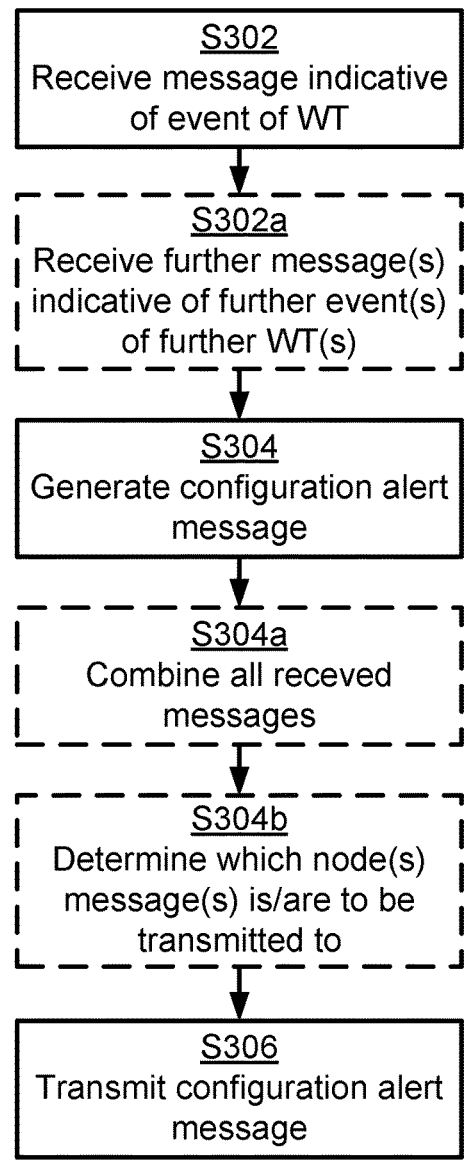

FIGS. 6 and 7 are flow charts illustrating embodiments of methods for is signaling an event associated with a wireless terminal 11 in a wireless backhaul network 10b as performed by the information providing node 12d. FIGS. 8 and 9 are flow charts illustrating embodiments of methods for handling an event associated with a wireless terminal in a communications network as performed by the information receiving node 12a. FIGS. 10 and 11 are flow charts illustrating embodiments of methods for signaling an event associated with a wireless terminal 11 in a wireless backhaul network 10b as performed by the backhaul controller node 20. The methods are advantageously provided as computer programs 52a, 52b, 52c.

Reference is now made to FIG. 6 illustrating a method for signaling an event associated with a wireless terminal 11 in a wireless backhaul network 10b as performed by the information providing node 12d according to an embodiment.

The information providing node 12d is configured to, in a step S102, detect an event. The event is associated with a wireless terminal 11. Further, the event causes a change of operation in at least a client node 17a, 17b, 17c, 17d or a hub node 16a, 16b, 16c in a wireless backhaul network 10b. Hence, according to one embodiment the event may cause a change of operation in at least one client node 17a, 17b, 17c, 17d, or in at least one hub node 16a, 16b, 16c, or in at least one client node 17a, 17b, 17c, 17d and in at least one hub node 16a, 16b, 16c. Examples of events that may be detected will be provided below.

Once the event has been detected the information providing node 12d informs other nodes in the communications network 10a of the event. Particularly, the information providing node 12d is configured to, in a step S104, transmit a message indicative of the event towards an information receiving node 12a. Examples of the information receiving node 12a as well as how the information receiving node 12a may act on the message indicative of the event will be provided below.

Alternatively, the event does not causes a direct change of operation in at least a client node 17a, 17b, 17c, 17d or a hub node 16a, 16b, 16c in the wireless backhaul network 10b. Instead, the event may merely indicate that such a change of operation is likely to occur. One example of such an event is if it is detected that the wireless terminal 11 is moved close to a border of its serving cell. Thus the event may be that the wireless terminal 11 is dose to a border of its serving cell. This may indicate that the wireless terminal 11 is likely to be handed over. But it may also be so that the wireless terminal 11 thereafter is moved towards the center of its serving cell, thereby not being handed over, thus not causing a direct change of operation in at least a client node 17a, 17b, 17c, 17d or a hub node 16a, 16b, 16c in the wireless backhaul network 10b. That is, in general terms, the change of operation depends on the event. The node or nodes affected by the event may thereby be better prepared for a change of operation, or at least be made aware that such a change of operation would be more likely than not. Embodiments relating to further details of signaling an event associated with a wireless terminal 11 will now be disclosed.

The information receiving node 12a, i.e., the network node receiving the message indicative of the event may be a backhaul controller node 20, a client node 17a, 17b, 17c, 17d, a hub node 16a, 16b, 16c, or any combination thereof, in the wireless backhaul network 10b. The message indicative of the event may be received by one or more such nodes in the communications network 10a.

There may be different kinds of messages transmitted by the information providing node 12d in step S104. For example, the message may be a configuration alert message. The message may comprise further information in addition to the event.

For example, the message may further be indicative of an identity of the wireless terminal 11 associated with the event. The receiving network node 12a may thereby be made aware of which wireless terminal n the event relates to. Alternatively the receiving network node 12a may explicitly query another network node regarding the identity of the wireless terminal 11 if needed.

For example, the message may further be indicative of an identity of the information providing node 12d, and/or at least one location of the information providing nodes 12d. That is, the origin of the messages or for which nodes the messages are associated with could be included, such that the receiving network node 12a is aware of where the configurations are needed (optionally assuming that some information of the network topology is known). Thereby the information receiving node 12a may be enabled to determine the likelihood of if and how the event will impact operation of the backhaul network 10b.

For example, the message may be indicative of parameters of the wireless terminal 11. Some of these parameters include, but are not limited to buffer status of the wireless terminal 11, capacity requirements of the wireless terminal 11, quality of service requirements of the wireless terminal 11, delay requirements of the wireless terminal 11, throughput requirements of the wireless terminal 11, and error probability requirements of the wireless terminal 11. Such information may by the information receiving node 12a be utilized when determining what reconfiguration of nodes in the wireless backhaul network 10b is suitable, or necessary.

Examples of different kinds of events that may be detected in step S102 and reported in step S104 by the information providing node 12d will now be disclosed. Non-limiting examples of such events associated with the wireless terminal 11 include mobility events, random access attempt events, radio bearer set-up events, radio bearer request events, location of the wireless terminal 11 (for example, the wireless terminal 11 being dose to a cell border), and detections of change of required service level of the wireless terminal 11. Further non-limiting examples of such events associated with the wireless terminal 11 include events indicative of a handover of the wireless terminal 11 to a network node 12a in the wireless backhaul network 10b.

Reference is now made to FIG. 7 illustrating methods for signaling an event associated with a wireless terminal 11 in a wireless backhaul network 10b as performed by the information providing node 12d according to further embodiments.

There may be different ways to handle events indicative of a handover of the wireless terminal 11 to a network node 12a in the wireless backhaul network 10b. For example, the information providing node 12d may wait for an acknowledgement of the message transmitted in step S104 before performing handover of the wireless terminal 11. Particularly, the information providing node 12d may be configured to, in an optional step S106, receive a confirmation message of the transmitted message. The confirmation message has been generated by the information receiving node 12a before handing over the wireless terminal 11 to the network node in the wireless backhaul network 10b.

Reference is now made to FIG. 8 illustrating a method for handling an event associated with a wireless terminal 11 in a wireless backhaul network 10b as performed by the information receiving node 12a according to an embodiment.

As noted above, the information providing node 12d in step S104 transmits a message indicative of an event associated with a wireless terminal 11. This message, embodied as a configuration alert message, is received by the information receiving node 12a. Hence, the information receiving node 12a is configured to, in a step S202, receive a configuration alert message indicative of an event associated with a wireless terminal 11. The configuration alert message has been generated by an information providing node 12d.

It is assumed that the event will cause in impact on operation of one or more nodes in the wireless backhaul network 10b. Based on this received message the information receiving node 12a therefore determines reconfiguration. Particularly, the information receiving node 12a is configured to, in a step S204, determine a re-configuration action causing a change of operation in at least a client node 17a, 17b, 17c, 17d or a hub node 16a, 16b, 16c in the wireless backhaul network 10b based on the received configuration alert message. As noted above, the event may cause a change of operation in at least one client node 17a, 17b, 17c, 17d, or in at least one hub node 16a, 16b, 16c, or in at least one client node 17a, 17b, 17c, 17d and in at least one hub node 16a, 16b, 16c. Examples of events have been provided above. Examples of reconfigurations, as different examples of change of operation, will be provided below.

Embodiments relating to further details of handling an event associated with a wireless terminal 11 in a wireless backhaul network 10b will now be disclosed.

As noted above, the information receiving node 12a may be a backhaul controller node 20, a client node 17a, 17b, 17c, 17d, a hub node 16a, 16b, 16c, or any combination thereof, in the wireless backhaul network 10b.

As noted in step S202, the message has been generated by the information providing node 12d. The message as received in step S202 may be received directly from the information providing node 12d or from an intermediate node, such as the backhaul controller node 20. Hence, the configuration alert message may by the information receiving node 12a in step S202 be received from either the information providing node 12d or a backhaul controller node 20. It is understood by the skilled person that if the message is received from the backhaul controller node 20, the information receiving node 12a is a client node 17a, 17b, 17c, 17d or a hub node 16a, 16b, 16c.

Different examples of how operation of a node in the wireless backhaul network 10b may be changed will now be disclosed.

According to a first example the change of operation relates to re-configuration of at least one wireless link. That is, according to an embodiment the change of operation involve a re-configuration and/or re-establishment of a wireless link 18 between the client node 17a, 17b, 17c, 17d and the hub node 16a, 16b, 16c in the wireless backhaul network 10.

According to a second example the change of operation relates to deactivating and/or activating at least one hub node 16a, 16b, 16c. That is, according to an embodiment the change of operation pertains to at least one of deactivating a first hub node 16a in the wireless backhaul network 10b, and activating a second hub node 16b in the wireless backhaul network 10b.

According to a third example the change of operation relates to deactivating and/or activating at least one client node 17a, 17b, 17c. That is, according to an embodiment the change of operation pertains to at least one of deactivating a first client node 17a in the wireless backhaul network 10b, and activating a second client node 17b in the wireless backhaul network 10b.

According to a fourth example the change of operation relates to a handover of a client node 17a, 17b, 17c, 17d. That is, according to an embodiment the change of operation pertains to handing over the client node 17a, 17b in the wireless backhaul network from a first hub node 16a to a second hub node 16b.

According to a fifth example the change of operation relates to use of a new modulation and coding scheme (MCS), new antenna configuration, or new encryption scheme. That is, according to an embodiment the change of operation pertains to at least one of change of used MSC, change of antenna configurations for communications between the client node 17a, 17b and the hub node 16a, 16b, 16c, and change of used encryption scheme for communications between the client node 17a, 17b, 17c, 17d and the hub node 16a, 16b, 16c.

According to a sixth example the change of operation relates to any combination of the above mentioned first, second, third, fourth, and fifth examples.

Reference is now made to FIG. 9 illustrating methods for handling an event associated with a wireless terminal 11 in a wireless backhaul network 10b as performed by the information receiving node 12a according to further embodiments.

The information receiving node 12a may be configured to perform any of the determined change of operation, as exemplified in the first, second, third, fourth, fifth, and sixth examples. Hence, the information receiving node 12a may be configured to, in an optional step S206, perform the determined re-configuration action (or actions). The information receiving node 12a may be configured to, thereafter, in an optional step S210 transmit a confirmation message of the received configuration alert message towards the information providing node 12d. The re-configuration may thereby be performed before the confirmation message is transmitted. It may thereby be ensured that nodes in the wireless backhaul network 10b have been reconfigured before performing any actions caused by the event associated with the wireless terminal 11.

For example, as noted above, the event may be indicative of a handover of the wireless terminal 11 to a network node 12a in the wireless backhaul network 10b. The information receiving node 12a may then be configured to, in an optional step S208, perform the determined re-configuration action after having received the configuration alert message as in step S202 and before having the wireless terminal 11 handed over to be served by the network node 12a in the wireless backhaul network 10b.

Further, the information receiving node 12a may instruct at least one network node in the wireless backhaul network 10b to perform the determined re-configuration action. Hence, the information receiving node 12a may be configured to, in an optional step S212, transmit a re-configuration message indicative of the determined re-configuration action to a network node in the wireless backhaul network 10b.

According to one embodiment the information receiving node 12a is configured to both perform the determined re-configuration action and to instruct at least one network node in the wireless backhaul network 10b to perform the determined re-configuration action. However, according to another embodiment the information receiving node 12a is configured to only either perform the determined re-configuration action or to instruct at least one network node in the wireless backhaul network 10b to perform the determined re-configuration action. The latter may be the case where the backhaul controller node 20 is not co-located with a network node 12a-c, 13a-b in the wireless backhaul network 10b, whereas the former may be the case where the backhaul controller node 20 is co-located with a network node 12a-c, 13a-b in the wireless backhaul network 10b.

Reference is now made to FIG. 10 illustrating a method for signaling an event associated with a wireless terminal 11 in a wireless backhaul network 10b as performed by the backhaul controller node 20 according to an embodiment.

As noted above, the message indicative of the event associated with wireless terminal 11 may either be transmitted directly to the information receiving node 12a or to the information receiving node 12a via at least one intermediate node, such as a backhaul controller node 20. Hence, the backhaul controller node 20 is configured to, in a step S302, receive a message indicative of an event associated with a wireless terminal 11, the event causing a change of operation in at least a client node 17a, 17b, 17c or a hub node 16a, 16b, 16c in the wireless backhaul network 10b. The message is received from an information providing node 12d.

The backhaul controller node 20 then forms a configuration alert message based on the received message. Hence, the backhaul controller node 20 is configured to, in a step S304, generate a configuration alert message based on the received message.

This message is then transmitted to the information receiving node 12a. Hence, the backhaul controller node 20 is configured to, in a step S306, transmit the configuration alert message to the information receiving node 12a in the wireless backhaul network 10b.

Reference is now made to FIG. 11 illustrating methods for signaling an event associated with a wireless terminal 11 in a wireless backhaul network 10b as performed by the backhaul controller node 20 according to further embodiments.

Embodiments relating to further details of signaling an event associated with a wireless terminal 11 in a wireless backhaul network 10b will now be disclosed.

Several configuration alert messages, possibly from different information providing nodes 12d could be combined if available as it could provide more information on the reconfiguration need of the wireless backhaul network 10b as a whole. The backhaul controller node 20 may thus receive a plurality of messages indicative of events of wireless terminals 11, possibly from a plurality of information providing nodes 12d. That is, the backhaul controller node 20 may be configured to, in an optional step S302a, receive further messages, each of which is indicative of a further event of a further wireless terminal 11. The backhaul controller node 20 may then combine two or more of the events into one or more configuration alert message(s) by analyzing the aggregated information of the two or more events. Hence, the backhaul controller node 20 may be configured to, in an optional step S304a, combine all received messages indicative of events into one configuration alert message. One example of such a configuration alert message is where all nodes intended as recipients of the configuration alert message are to perform the same reconfiguration.

Further, the backhaul controller node 20 may determine to which nodes in the backhaul network the configuration alert message is to be transmitted. For example, each configuration alert message may be for a specific node. Alternatively, the configuration alert message may comprise aggregated information and be transmitted to all nodes affected by the aggregated information. Hence, the backhaul controller node 20 may be configured to, in an optional step S304b, determine, based on the event, to which information receiving node, or nodes 12a to transmit the configuration alert message. That is, one or more configuration alert messages may be transmitted to those nodes being reconfigured.

FIG. 15 is a signalling diagram according to at least some of the herein disclosed embodiments. The signalling diagram illustrates how a reconfiguration procedure according to at least some of the herein disclosed embodiments may be performed when a wireless terminal 11 is handed over from a serving network node 12d to a target network node 12a.

S501: The wireless terminal 11 is operatively connected to, and thus served by, its serving network node 12d.

S502: The wireless terminal 11 performs channel measurements and reports the channel measurements to the serving network node 12d. The channel measurements are by the wireless terminal 11 performed so as to investigate if another network node, i.e., a candidate target network node, would provide better service to the wireless terminal 11 than the serving network node 12d.

S503: It is assumed that such a candidate target network node 12a is identified in step S502. The candidate target network node 12a is assumed to currently provide a medium capacity throughput. The serving network node 12d therefore makes a handover decision. The handover decision represents an event associated with the wireless terminal 11. The serving node 12a thus acts as an information providing node and thus performs step S102.

S504: The serving network node 12d transmits a message indicative of the event towards an information receiving node, as in step S104. The message is transmitted to the backhaul controller node 20 which thus acts as an information receiving node. The message is received by the backhaul controller node 20 as in step S302.

S505: The serving network node 12d sends a handover request of the wireless terminal 11 to the candidate target network node 12a.

S506: The candidate target network node 12a accepts the handover of the wireless terminal 11 and therefore sends a handover request acknowledgement to the serving network node 12d.

S507: Upon reception of the handover request acknowledgement, the serving network node 12d sends a radio resource control reconfiguration instructions to the wireless terminal 11, thereby instructing the wireless terminal 11 to establish a connection with the target network node 12a.

S508: The wireless terminal 11, upon reception of the radio resource control reconfiguration instructions the wireless terminal 11 detaches from the serving network node 12d.

S509: After having detached from the serving network node 12d the wireless terminal 11 establishes an operational connection to the target network node 12a and synchronizes with the target network node 12a.

S510: The backhaul controller node 20 having received the message transmitted in step S504 determines a reconfiguration of the wireless backhaul network 10b.

S511: The backhaul controller node 20 sends instructions of the determined reconfiguration (i.e., a change of operation to a high throughput level) to the hub node 16a in a re-configuration message.

S512: The hub node 16a starts its reconfiguration in order to provide a high throughput level.

S513: The hub node 16a finalizes its reconfiguration to provide the high throughput level. From the signalling diagram of FIG. 15 it is thus clear that any required reconfiguration of the wireless backhaul network 10b is performed before data of the wireless terminal 11 is backhauled.

S514: The wireless terminal 11 transmits data to the target network node 12a now serving the wireless terminal 11. Since step S513 has already been performed, the wireless terminal 11 transmits data to the target network node 12a now serving the wireless terminal at a high throughput level. The data is backhauled to a client node 17a and then to a hub node 16a. As is clear from the signalling diagram of FIG. 15 the temporary performance drop of FIG. 13 is thus avoided.

A first particular embodiment for signaling, and handling, an event associated with a wireless terminal 11 in a wireless backhaul network 10b based on at least some of the above disclosed embodiments will now be disclosed in detail. Reference is made to FIGS. 1a and 1b.

Assume that in FIG. 1a, a situation is illustrated where a high throughput wireless terminal 11 is moving from the coverage of a serving network node 12d towards a target network node 12a (i.e., in the direction (a) in FIG. 1a) which is operatively connected through a wireless backhaul connection to another network node 13a. Hence, for example, in some scenarios handover will occur to the target network node 12a; in some scenarios the target network node 12a will start receiving/transmitting data from/to the wireless terminal 11. The network node 13a (being associated with a hub node 16a, see FIG. 1b) in the FIG. 1a is currently serving two network nodes 12a, 12c (through their clients), but will be a bottleneck if too much traffic is generated from the two network nodes 12a, 12c. For moderate traffic loads, it is likely that no high throughput will be generated from both two network nodes 12a, 12c simultaneously, but for higher loads, such limitations are more likely.

Assume that initially, network node 13b and network node 12b are powered down (i.e., not activated). In FIG. 1a, it is for illustrative and non-limiting purposes further assumed that traffic is already generated from the network node 12c and that a significant part of the backhaul capabilities is being occupied. Especially with the wireless terminal 11 being served by the network node 12a, the network node 13a will become a bottleneck affecting all wireless terminals served by the network nodes 12a, 12c. In such a situation, the serving network node 12d acting as an information providing node transmits a configuration alert message to the backhaul controller node 20, as in step S102 above. The actual signaling does not have to be carried out from the network node 12d to a hub node 16a, 16b, 16c, but could take any path such that the content of the message can reach a node in the wireless backhaul network 10b responsible for taking action from such signaling. With this information, the wireless backhaul network 10b is aware of the configuration need and has time to reconfigure the wireless backhaul network 10b before the handover of the wireless terminal 11 from the network node 12d to the network node 12a has been performed.

The reconfiguration may result in network node 13b being powered up and network node 12a being handed over to network node 13b before the wireless terminal 11 is handed over to network node 12a. Since the reconfiguration of the nodes in the wireless backhaul network 10b occurred before the wireless terminal 11 is handed over to the network node 12a, there will be no performance drop due to reconfiguration when the wireless terminal 11 is operatively connects to the network node 12a.

Conversely, if the wireless terminal 11 is moved in direction (b) in FIG. 1a, the reconfiguration may involve to power down one or more of the network nodes in the wireless backhaul network 10b.

Figure 12:
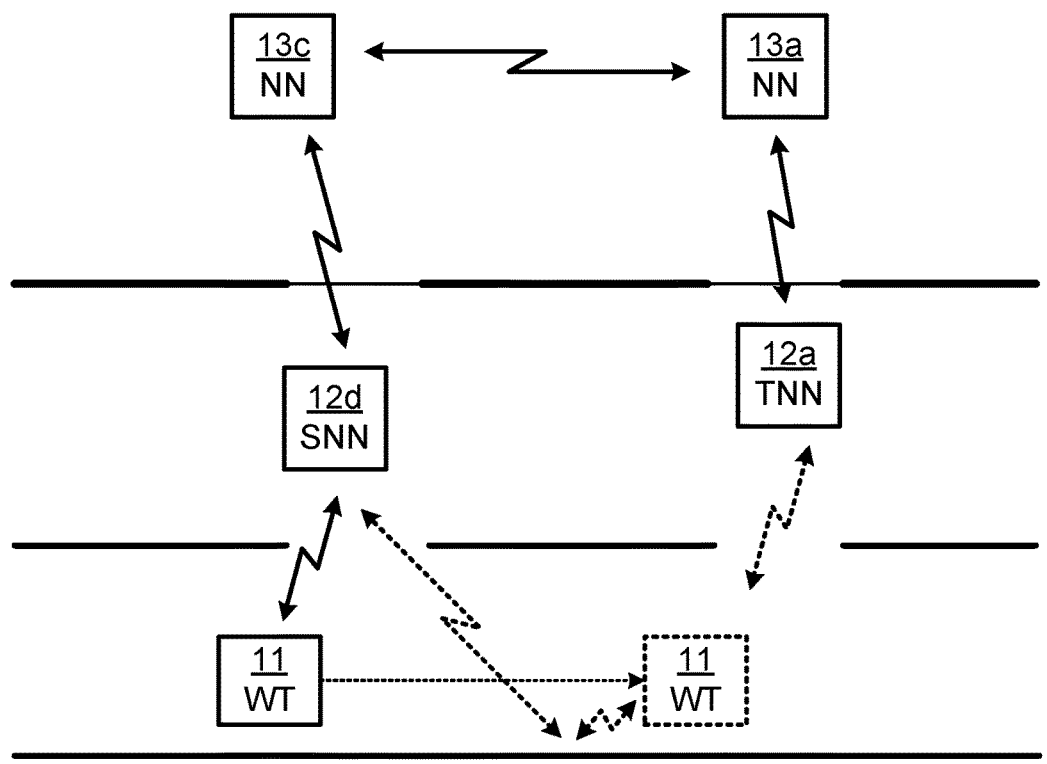
FIG. 12 is a schematic diagram illustrating part of a communication network according to an embodiment.

A second particular embodiment for signaling, and handling, an event associated with a wireless terminal 11 in a wireless backhaul network 10b based on at least some of the above disclosed embodiments will now be disclosed in detail. Reference is made to FIG. 12.

In the context of so-called 5G communications networks, self-backhauling of network nodes may be used, when the network nodes are operating at millimeter wave frequencies (mmW). In such scenarios the diffraction and penetration losses may be large. Network nodes acting as relays for such self-backhauling may be dynamically or semi-statically selected to overcome such challenges when operating at mmW.

One example of such a procedure is schematically illustrated in FIG. 12. In FIG. 12 each network node 12a, 12b is associated with a respective client and each network node 13a, 13b is associated with a respective hub (as in FIG. 1b). Assume that whilst the wireless terminal 11 is carried by a person moving through a building (in FIG. 12 from the left position of the wireless terminal 11 towards the right position of the wireless terminal 11) the traffic of the wireless terminal 11 is self-backhauled using one of the network nodes 12d, 12a (e.g., situated dose to windows of the building and with line-of-sight (through the windows)) to two 5G mmW network nodes 13a, 13c. The target network node 12a is in this context a sleeping network node with the potential for a good connection to a network node 13a in a low power mode, hence with a backhaul link in a low capacity state. The wireless terminal 11, upon movement towards the right in FIG. 12 discovers the target network node 12a and signals this to the serving network node 12d that forwards this information to the backhaul network. This triggers the network node 13a to enable a high capacity link to the client in the target network node 12a, thereby enabling the wireless terminal 111 to continue in high capacity mode when switching to being backhauled through the target network node 12a.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for signaling an event of a wireless terminal in a radio communications network, the method being performed by an information providing node, the method comprising:
    detecting an occurrence of an event of a wireless terminal, the event triggering a need for a reconfiguration of a wireless backhaul network that causes a change of operation in at least a client node or a hub node in the wireless backhaul network,
    wherein the change of operation comprises a reconfiguration of at least one wireless backhaul link between at least the client node or the hub node or a reconfiguration of at least the client node or the hub node before data of the wireless terminal is transmitted towards a backhaul node; and
    transmitting a message indicative of the event towards an information receiving node in the wireless backhaul network, wherein the information receiving node performs the change of operation based on the message before data of the wireless terminal is transmitted towards the backhaul node.

2. The method according to claim 1, wherein the information receiving node is at least one of a backhaul controller node, the client node, or the hub node, in the wireless backhaul network.

3. The method according to claim 1, wherein the message is a configuration alert message.

4. The method according to claim 1, wherein the message further is indicative of an identity of the wireless terminal.

5. The method according to claim 1, wherein the message further is indicative of at least one of an identity of the information providing node, and at least one location of the information providing nodes.

6. The method according to claim 1, wherein the message further is indicative of at least one of buffer status of the wireless terminal, capacity requirements of the wireless terminal, quality of service requirements of the wireless terminal, delay requirements of the wireless terminal, throughput requirements of the wireless terminal, and error probability requirements of the wireless terminal.

7. The method according to claim 1, wherein the event is at least one of a mobility event, a random access attempt event, a radio bearer set-up event, a radio bearer request event, and a detection of change of required service level of the wireless terminal.

8. The method according to claim 1, wherein the event is indicative of a handover of the wireless terminal to a network node in the wireless backhaul network.

9. The method according to claim 8, further comprising:
    receiving a confirmation message of the transmitted message, the confirmation message having been generated by the information receiving node before handing over the wireless terminal to the network node in the wireless backhaul network.

10. A method for handling an event of a wireless terminal in a radio communications network, the method being performed by an information receiving node in a wireless backhaul network, the method comprising:
receiving a configuration alert message indicative of an occurrence of an event of a wireless terminal, the configuration alert message having been generated by an information providing node and triggering a need for a reconfiguration of the wireless backhaul network; and
determining a re-configuration action causing a change of operation in at least a client node or a hub node in the wireless backhaul network,
wherein the change of operation comprises a reconfiguration of at least one wireless backhaul link between at least the client node or the hub node or a reconfiguration of at least the client node or the hub node before data of the wireless terminal is transmitted towards a backhaul node based on the received configuration alert message.

11. The method according to claim 10, wherein the information receiving node is at least one of a backhaul controller node, the client node, or the hub node, in the wireless backhaul network.

12. The method according to claim 10, wherein the configuration alert message is received from either the information providing node or a backhaul controller node.

13. The method according to claim 10, wherein the change of operation involves a re-configuration and/or re-establishment of a wireless link between the client node and the hub node in the wireless backhaul network.

14. The method according to claim 10, wherein the change of operation pertains to at least one of deactivating a first hub node in the wireless backhaul network, and activating a second hub node in the wireless backhaul network.

15. The method according to claim 10, wherein the change of operation pertains to at least one of deactivating a first client node in the wireless backhaul network, and activating a second client node in the wireless backhaul network.

16. The method according to claim 10, wherein the change of operation pertains to handing over the client node in the wireless backhaul network from a first hub node to a second hub node.

17. The method according to claim 10, wherein the change of operation pertains to at least one of change of used modulation and coding scheme, change of antenna configurations for communications between the client node and the hub node, and change of used encryption scheme for communications between the client node and the hub node.

18. The method according to claim 10, further comprising:
performing the determined re-configuration action; and thereafter:
transmitting a confirmation message of the received configuration alert message towards the information providing node.

19. The method according to claim 10, wherein the event is indicative of a handover of the wireless terminal to a network node in the wireless backhaul network.

20. The method according to claim 19, further comprising:
performing the determined re-configuration action after having received the configuration alert message and before having the wireless terminal handed over to be served by the network node in the wireless backhaul network.

21. The method according to claim 10, further comprising:
transmitting a re-configuration message indicative of the determined re-configuration action to a network node in the wireless backhaul network.

22. A method for signaling an event of a wireless terminal in a radio communications network, the method being performed by a backhaul controller node, the method comprising:
receiving a message, from an information providing node, indicative of an occurrence of an event of a wireless terminal, the event triggering a need for a reconfiguration of a wireless backhaul network that causes a change of operation in at least a client node or a hub node in a wireless backhaul network,
wherein the change of operation comprises a reconfiguration of at least one wireless backhaul link between at least the client node or the hub node or a reconfiguration of at least the client node or the hub node before data of the wireless terminal is transmitted towards a backhaul node;
generating a configuration alert message based on the received message; and
transmitting the configuration alert message to an information receiving node in the wireless backhaul network, wherein the configuration alert message comprises information for the reconfiguration.

23. The method according to claim 22, further comprising:
receiving further messages each of which is indicative of a further event of a further wireless terminal; and
combining all received messages indicative of events into one configuration alert message.

24. The method according to claim 22, further comprising:
determining, based on the event, to which information receiving node to transmit the configuration alert message.

25. An information providing node for signaling an event of a wireless terminal in a communications network, the information providing node comprising a processing unit configured to cause the information providing node to:
detect an occurrence of an event of a wireless terminal, the event triggering a need for a reconfiguration of a wireless backhaul network that causes a change of operation in at least a client node or a hub node in a wireless backhaul network,
wherein the change of operation comprises a reconfiguration of at least one wireless backhaul link between at least the client node or the hub node or a reconfiguration of at least the client node or the hub node before data of the wireless terminal is transmitted towards a backhaul node; and
transmit a message indicative of the event towards an information receiving node in the wireless backhaul network, wherein the information receiving node performs the change of operation based on the message before data of the wireless terminal is transmitted towards the backhaul node.

26. The information providing node according to claim 25, wherein said information providing node is co-located with a backhaul controller node.

27. The information providing node according to claim 25, wherein said information providing node is a source network node of the wireless terminal, or a target network node of the wireless terminal.

28. An information receiving node for handling an event of a wireless terminal in a radio communications network, the information receiving node comprising a processing unit configured to cause the information receiving node to:
- receive a configuration alert message indicative of an occurrence of an event of a wireless terminal, the configuration alert message having been generated by an information providing node and triggering a need for a reconfiguration of the wireless backhaul network; and
- determine a re-configuration action causing a change of operation in at least a client node or a hub node in a wireless backhaul network before data of the wireless terminal is transmitted towards a backhaul node based on the received configuration alert message.

29. The information receiving node according to claim 28, wherein said information receiving node is co-located with a backhaul controller node, the client node, or the hub node.

30. A backhaul controller node for signaling an event of a wireless terminal in a radio communications network, the backhaul controller node comprising a processing unit configured to cause the backhaul controller node to:
- receive a message indicative of an occurrence of an event of a wireless terminal, the event triggering a need for a reconfiguration of a wireless backhaul network that causes
- wherein the change of operation comprises a reconfiguration of at least one wireless backhaul link between at least the client node or the hub node or a reconfiguration of at least a client node or a hub node in a wireless backhaul network,
- the message being received from an information providing node before data of the wireless terminal is transmitted towards a backhaul node;
- generate a configuration alert message based on the received message; and
- transmit the configuration alert message to an information receiving node in the wireless backhaul network before data of the wireless terminal is transmitted towards the backhaul node.

* * * * *